April 23, 1935.         D. BRATICH         1,998,652
SEAL FOR MILK CANS
Filed Aug. 9, 1933
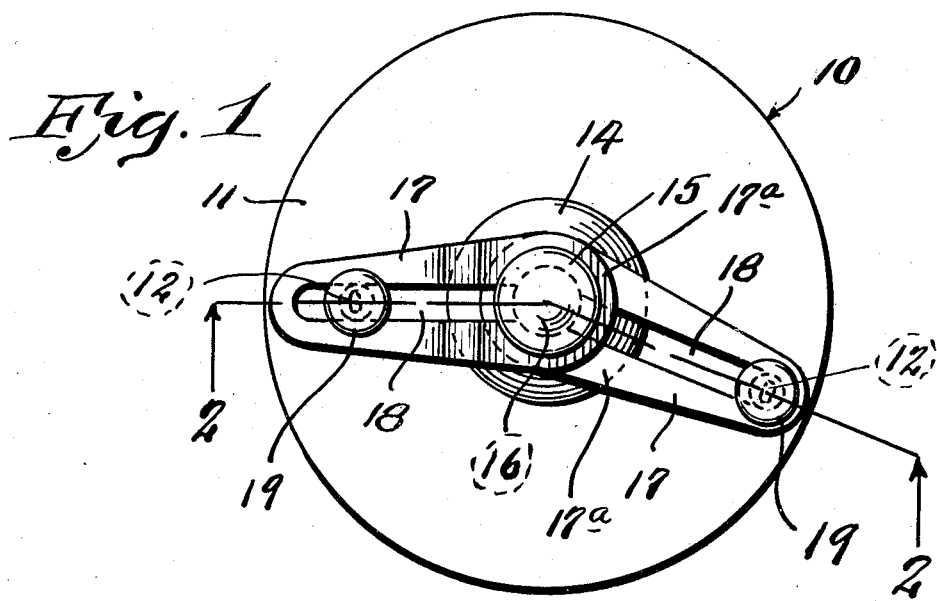
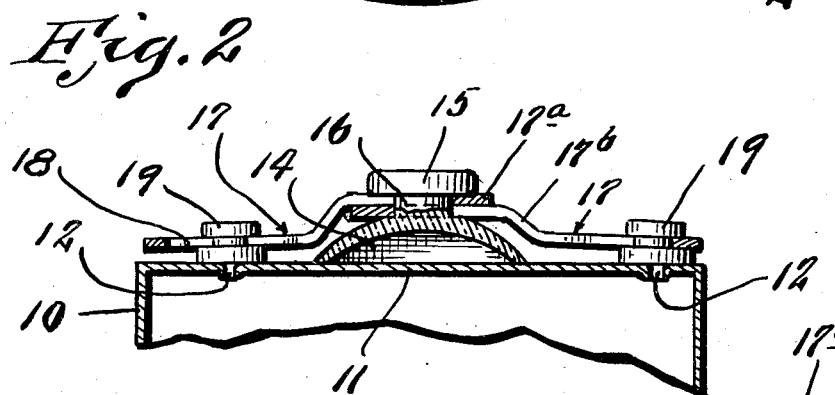
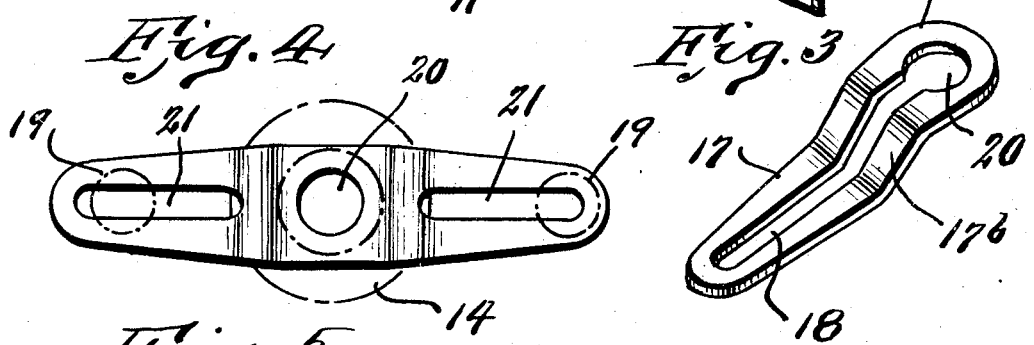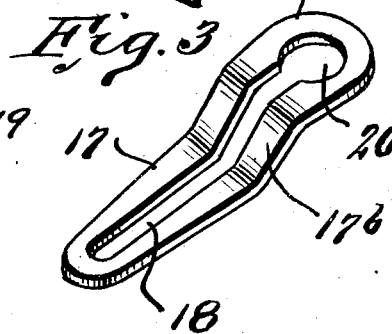
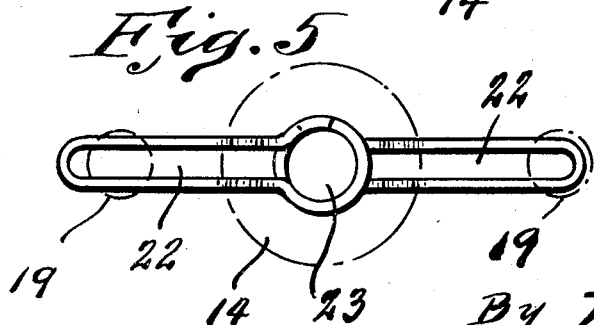
Inventor
Daniel Bratich
By William Janus Atty.

Patented Apr. 23, 1935

1,998,652

UNITED STATES PATENT OFFICE 1,998,652

SEAL FOR MILK CANS

Daniel Bratich, St. Louis, Mo., assignor of one-half to Kamenko Manic, St. Louis, Mo.

Application August 9, 1933, Serial No. 684,312

6 Claims. (Cl. 220—24)

This invention relates to new and useful improvements in seals for milk cans.

The apertures punctured in the top of a milk can are very seldom located at diametrically opposed points or equidistant from the center of the top wall. One of the objects of the present invention is the provision of a seal comprising a pair of arms adapted to be attached to said top wall and adjustable about the center thereof so as to bring each arm in radial line with the respective aperture regardless of the location thereof relatively to each other.

Another object of the invention is to so mount a seal pad in each arm that the former can be moved longitudinally of the latter in accordance with the distance of the respective aperture from the center of the top wall.

Further objects of the invention are to provide a pair of resilient arms, each carrying a pad adapted to be pressed against the top of a milk can to form a closure for the respective aperture and to provide a suction cup for detachably securing said arms in position on a milk can.

Additional objects of the invention are to provide a seal for a milk can which seal is highly efficient in performing its intended functions, can be readily applied in position, and can be economically manufactured.

With these and other objects in view, my invention consists in certain novel features of construction and arrangement of parts, hereinafter more fully described and claimed, and illustrated in the accompanying drawing, in which—

Figure 1 is an enlarged top plan view showing the seal applied to a milk can.

Figure 2 is a vertical cross section taken on line 2—2 of Figure 1.

Figure 3 is an enlarged perspective detail view of one of the arms.

Figure 4 is a top plan view of a modified form of my invention showing the suction cup and seal pads in dotted lines.

Figure 5 is still another modified form of my invention.

Referring by numerals to the accompanying drawing, 10 indicates a milk can, the top wall 11 of which is provided with a pair of apertures 12. A suction cup 14 is detachably attached to the central part of the top wall 11. The upper end of said cup terminates in a button or enlargement 15 which is connected to said suction cup by a neck or reduced portion 16. A pair of arms 17, preferably formed of sheet metal and resilient, are secured to cup member 14 and extend radially therefrom, the length of each arm from said cup being slightly less than the radius of the milk can.

Each arm 17 is formed with a longitudinally disposed slot 18 which, in the preferred form, extends the full length of said arm. A sealing pad 19, preferably made of rubber, is arranged in each slot and extends downwardly from said arm. Each pad 19 can be moved longitudinally of said arm in order to bring said pad into alignment with the aperture which it is desired to seal. Thus the pads of the respective arms can be positioned any distance from the center of the can in accordance with the location of the aperture.

The inner end of each arm is preferably wider than the outer end and has formed therein a comparatively large opening 20, the diameter of which is substantially the same as the diameter of the reduced portion 16.

In attaching the arms to the cup, the enlargement or button 15 is slipped through the openings 20 whereupon the arms are securely attached to the suction cup. By virtue of this arrangement the arms can be adjusted about the center of said suction cup so that they can occupy angular positions relatively to each other as shown in Figure 1. Thus the sealing pads or closure members 19 can be adjusted to any distance about the center of said milk can. These features permit the seal to be used to close the apertures regardless of the disposition thereof in the top wall of the milk can.

The slots 18 may be extended the full length of the arms and communicate with the opening 20 as shown in Figures 1 to 3 or each slot may be terminated short of the center as shown at 21 in Figure 4. Furthermore, instead of making the arms adjustable, they can be formed integral and extend in diametrically opposed relation, as shown in Figure 4.

In the modified form shown in Figure 5, the arms are formed of spring wire which is bent to provide slots 22 for receiving the seal pads or closure members 19 and a central opening 23 for attaching to the suction cup 14.

Preferably the arms are formed resilient and divergent downwardly from the center or suction cup 14. Thus, when the cup is attached in position on top of a milk can, the seal pads are held under pressure against said top and form effective seals for the apertures thereof. The inner ends 19a are offset upwardly, as indicated at 17b, to accommodate the suction cup 14; thereby the resiliency of said arms is increased.

The closure members or seal pads 19 are preferably made of rubber and are sufficiently large to cover or close the aperture 20. They are so mounted in arms 17 that they can be adjusted longitudinally thereof as required. Thus my improved seal can be used on a can regardless of the location or spacing of the apertures.

While the seal is primarily intended for use on milk cans, it can be equally as well used on syrup cans, and other cans containing liquids having apertured top walls.

In using the seal, the suction member 14 is pressed against the central part of the apertured end wall of the can. The arms 17 are then adjusted radially to bring them in alignment with the respective apertures. Each pad or closure member 19 is now moved longitudinally in the respective arm so as to cause it to bear against and close the corresponding aperture. If it is desired to use the can, as in pouring milk from the milk can, it is not necessary to detach the seal device from the apertured wall. The arms are merely shifted and moved on their pivotal mounting on the suction member, whereupon both apertures are exposed. When finished pouring liquid from the can, the apertures can be closed again by moving the arms to closed positions.

The arms 17 are preferably formed of sheet metal; however, other sheet material having sufficient degree of resiliency, such as fiber, celluloid, and the like, can be used instead of metal.

The seal is of simple construction and can be easily applied in position as it does not require extraneous securing means.

While I have described and shown in the specification and accompanying drawing the preferred form of my invention, it is obvious that various other changes in the construction and arrangement of parts of my improved seal can be made and substituted for those herein disclosed without departing from the spirit of my invention.

I claim:

1. A seal for milk cans comprising a support member adapted to be secured to the central part of the end wall of a milk can, a pair of resilient arms movably mounted at their inner ends to said support member and extending radially therefrom, each arm being provided with a longitudinal slot, and a closure pad movably mounted in each slot and extending downwardly therefrom and held by the resiliency of each arm in close engagement with the corresponding aperture of said milk can, each arm being adjustable on said support member to bring it into radial position aligned with the corresponding aperture, and each closure pad being adjustable longitudinally of its respective arm in accordance with the distance of the corresponding aperture from the axis of said support member.

2. A seal for milk cans comprising a suction member adapted to be secured by suction to the surface of the end wall of a milk can, a pair of arms carried by said suction member, and adjustable radially thereof, each arm being slotted longitudinally, and a seal pad movably mounted in the slot of each arm and held by the latter in position to close the aperture formed in said end wall, each pad engaging the surface of said end wall only and being adjustable longitudinally of its respective arm in accordance with the location of the corresponding aperture.

3. A seal for cans comprising a suction cup adapted to be secured by suction to the end wall of a milk can, a pair of arms movably mounted at their inner ends on said cup and adjustable thereabout independently of each other, and a closure member carried by each arm for closing the corresponding aperture formed in said end wall, each of said arms being adjustable into radial position in line with the corresponding aperture.

4. A seal for cans comprising a suction cup adapted to be secured by suction to the central part of the end wall of a milk can, a pair of resilient arms movably mounted at their inner ends on said cup and adjustable thereabout independently of each other, each of said arms being provided with a longitudinal slot, and a closure member movably mounted in the slot of each arm and extending downwardly therefrom for closing the corresponding aperture formed in said end wall, each of said arms being adjustable into radial position in line with the corresponding aperture and each of said closure members being adjustable longitudinally in each arm in accordance with the distance of the corresponding aperture from said suction cup.

5. In a device of the class described, the combination with a can provided in one of its end walls with an aperture, of a suction cup adapted to be detachably secured to the surface of said apertured end wall and having an upwardly presented reduced portion, an arm pivotally mounted at its inner end on said reduced portion and extending radially therefrom and adjustable about the axis thereof, and a closure member adjustable about the axis of said portion, and a closure pad mounted on said arm and adjustable longitudinally thereof, said pad being held by said arm in surface contact with said apertured end wall and adapted to close the aperture formed therein.

6. A can seal comprising a suction cup adapted to be secured by suction to the apertured end of a can, an arm movably mounted on said cup member and adjustable about the axis thereof, and a rubber pad movably mounted on said arm and adjustable longitudinally thereof, said pad being adapted to be held by said arm in a position to close the aperture of the end wall to which said seal is applied.

DANIEL BRATICH.